(12) United States Patent
Fukuzawa et al.

(10) Patent No.: US 6,295,106 B1
(45) Date of Patent: Sep. 25, 2001

(54) ENERGY-EFFICIENT FULL-COLOR LIQUID CRYSTAL DISPLAY

(75) Inventors: Tadashi Fukuzawa, Tokyo; Sayuri Kohara, Sagamihara, both of (JP); Victor Yee Way Lee, San Jose, CA (US); Robert D. Miller, San Jose, CA (US); John Campbell Scott, Los Gatos, CA (US); Sally A. Swanson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/482,151

(22) Filed: Jan. 12, 2000

(51) Int. Cl.[7] .................. G02F 1/1335; G02F 1/1333
(52) U.S. Cl. ................ 349/71; 349/69; 349/159; 428/690
(58) Field of Search ............... 349/69, 71, 159; 428/690; 427/213

(56) References Cited

U.S. PATENT DOCUMENTS 5,475,515 * 12/1995 Yoshinaga et al. ................. 349/89
5,966,393 * 10/1999 Hide et al. ......................... 372/23
6,017,584 * 1/2000 Albert et al. .................... 427/213.3

* cited by examiner

*Primary Examiner*—Kenneth Parker
*Assistant Examiner*—Julie Ngo
(74) *Attorney, Agent, or Firm*—Scully, Scott, Murphy & Presser; Daniel E. Johnson, Esq.

(57) ABSTRACT

Novel liquid crystal display (LCD) structures for full-color liquid crystal displays using photoluminescent (PL) fibers. The new architectures simplify the LCD fabrication process by replacing complicated, time consuming photolithography steps for color filter fabrication to a low-cost, high-throughput fiber spinning technology. The new LCD architecture implementing the approach has a higher power efficiency than conventional LCDs. Three structures of LCD devices utilizing photoluminescent (PL) fiber arrays includes: a first structure having PL fiber arrays situated behind the LC shutter (relative to viewers); a second structure having PL fiber arrays situated on top of the LC shutter; and a third structure where the PL fiber arrays are located outside the LC cell. In one of these structures, the fibers not only photoluminesce, but also polarize incident light thus reducing LCD fabrication cost.

6 Claims, 7 Drawing Sheets

ENERGY-EFFICIENT FULL-COLOR LIQUID CRYSTAL DISPLAY

BACKGROUND OF THE INVENTION

1. Field of the Invention

The present invention relates generally to liquid crystal display devices, and particularly, to a novel, low-cost, energy-efficient liquid crystal display device implementing dye impregnated photoluminescent fibers.

2. Discussion of the Prior Art

Current liquid crystal display devices employing white fluorescent backlight, with diffusers, color filters and a combination of a polarizer and analyzer, result in a luminous throughput efficiency of 5% or less. As liquid crystal display pixels become smaller, the aperture ratio (the open area of the pixel relative to the total pixel area) becomes smaller because the footprint size of the thin-film transistor (TFT) device can not be reduced proportionately. Further, the fabrication process for making the color filter is complicated and increases the cost of the display.

FIG. 1 is a schematic illustration depicting a pixel 12 of a conventional full-color LCD panel. The pixel 12 has three liquid crystal cells, which corresponds to red, green and blue cells. As shown in FIG. 1, the panel includes an optical guide 27, which guides white backlight 28 from a fluorescent lamp (not shown) through a polarizer 26, transparent electrodes 25a–25c, liquid crystal material 24, a transparent electrode 23, and red, green and blue color filters 20, 21 and 22, respectively.

Colored light is finally emitted through a glass substrate 19 and an analyzer 18. The polarization directions of polarizer 26 and analyzer 18 are aligned to obtain the designed contrast. It is understood that a diffuser element (not shown) may be placed on the light guide 27 for distributing transmitted light uniformly through the panel. A prism sheet (or a pair of prism sheets) additionally may bring the scattered light towards normal direction. It is understood that a liquid crystal cell additionally is comprised of TFT arrays and transparent electrodes (preferably comprised of Indium Tin-Oxide "ITO").

Even in the ideal case, white visible light utilizes only ⅓ of the incident light for this configuration because of the red, green and blue color filters. Moreover, the fabrication process to make these color filters requires exacting optical lithography technology, which increases the panel cost and the manufacturing time.

Color conversion utilizing photoluminescence phenomena have been described in the prior art. For instance, the references entitled "Incorporation of Photoluminescent Polarizers into Liquid Crystal Displays," Science 279, 835 (1998) by C. Weder, C. Sarwa, A. Montali, C. Bastiaansen, P. Smith, and "Polarizing Energy Transfer in Photoluminescent Materials for Display Applications," Nature, 392, 261 (1998) by A. Montali, C. Bastiaansen, P. Smith, C. Weder, each describe a new type of liquid crystal display implementing a photoluminescent sheet with polarized emission. Although the devices described in these references address the prior art limitations of the conventional device, the devices are not full color devices, and only a single or two color device can be achieved.

According to the display devices implementing photoluminescence as described in these references, a fluorescent dye absorbs the incident light and either re-emits a different color of a longer wavelength or transfers the energy to a second dye which then re-emits a different color of a longer wavelength. For instance, in the above-mentioned reference entitled "Polarizing Energy Transfer in Photoluminescent Materials for Display Applications," the ultraviolet (UV) light from the backlight is absorbed by a dye material DMC (Coumarin 1), and the energy is transferred to a stretch-aligned conjugated polymer material, EHO-OPPE, which re-emits polarized green light. When a sheet of this dye/polymer blend is placed in a liquid crystal display device it replaces both a polarizer and green color filter. This reference however, does not describe how to make a full color liquid crystal display.

It would be highly desirable to provide a full color liquid crystal display without the need for color filters and a polarizer, and further, a full color liquid crystal display that is highly efficient and can be manufactured using very low cost fabrication methods.

SUMMARY OF THE INVENTION

The present invention pertains to an improved liquid crystal display device which improves upon the display device types implementing photoluminescence.

According to one embodiment of the invention, instead of a using a sheet of color-converter material, the display device implements arrays of bulk fiber, impregnated with dye materials and other stretch-aligned polymer materials functioning to cooperatively absorb the light from the backlight and to emit blue, green and red polarized light and, replace either the polarizer or the analyzer in each fiber array. The backlight source emits ultraviolet (UV) light which is totally absorbed by either the emitting polymer or the dye material in each fiber array. For example, in one embodiment of the fiber array, the energy is first absorbed by a small molecule dye (unpolarized) and transferred to a stretch-aligned polymer which emits polarized light of longer wavelength. The dye/polymer combination is selected to give the appropriate color coordinates for blue, green, or red pixels. Each fiber array may be located behind liquid crystal light shutters within the LC cell, wherein it replaces the polarizer and only an analyzer is needed to complete the light valve. The polarized light from the fiber must be aligned with the transmitting orientation of the liquid crystal light shutter in order to obviate the need for one polarizer. In another embodiment, the fiber array may be located in front of the liquid crystal light shutters (closest to the viewer) within the LC cell and replaces or acts as the analyzer. Alternately, the PL fiber arrays may be located outside the LC cell and function as a simple color generation layer.

Alternately, in each fiber array, the energy is first absorbed in a stretch-aligned polymer and transferred to a molecule dye (unpolarized) which emits polarized light of longer wavelength. The polymer/dye combination is selected to give the appropriate color coordinates for blue, green, or red pixels.

It is further recognized that cost reduction may be achieved without the use of polarized emission. Thus, in a second alternate embodiment, the conjugated polymer emitter may be replaced with a second dye material which emits unpolarized light of selected wavelengths. In this case, materials may be used which both absorb and emit without the need for transfer. Thus, a wider range of dyes becomes available for use, especially at the red end of the spectrum.

Moreover, to obtain a full color display, each pixel is made up of a set of three sub-pixels: red, green and blue, with each sub-pixel consisting of a single emitting fiber and a liquid crystal light shutter. Thus, advantageously, known techniques of the weaving/textile/composites industry may be utilized to fabricate arrays of aligned fibers and then laminate them to the light shutter array.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
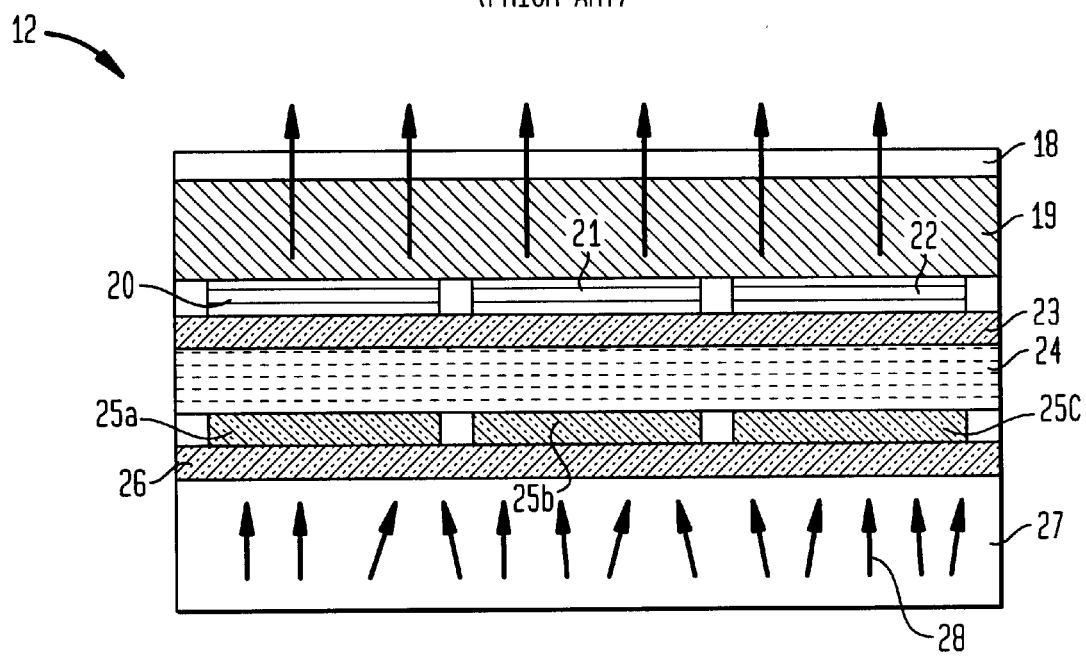
FIG. 1 is a schematic illustration depicting a pixel of a conventional full-color LCD panel.
Figure 2:
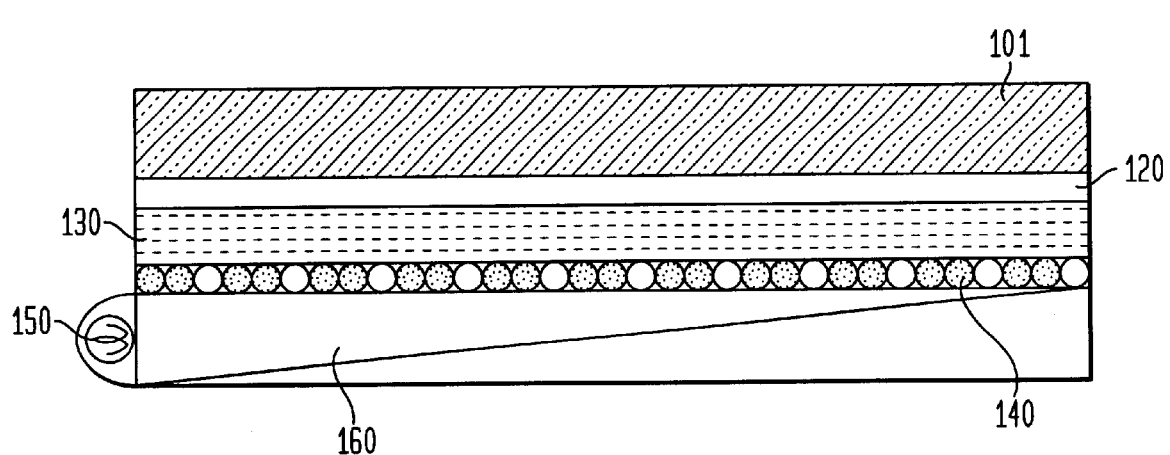
FIG. 2 illustrates conceptually a cross section of the LCD panel having pixels implementing the PL fiber arrays according to the invention.

FIG. 2 generally depicts a cross-section of the LCD panel 100 having the LCD structures according to the invention. In FIG. 2, the panel includes a glass substrate 101, an analyzer 120, an array of liquid crystal shutter units 130, an array of dye-doped polymer fibers 140, an ultraviolet (UV) fluorescent lamp 150, and, a UV light guide 160.

According to the present invention, there are provided three types of LCD devices utilizing photoluminescent (PL) fiber arrays. The PL fiber arrays are located inside the LC cells in the first and the second types. The fibers not only photoluminesce, but also polarize incident light. In the first embodiment described herein with respect to FIGS. 3, 7(a) and 7(b), the fibers are situated behind the LC shutter (relative to viewers) and act as a polarizer. In the second embodiment described herein with respect to FIGS. 4, 8(a) and 8(b), the PL fibers are placed on top of the LC shutter and act as an analyzer. For each type, two methods will be described for implementing the fiber arrays into the LCD structures. In a third embodiment, the PL fiber arrays are located outside the LC cell in front of the LC shutter and function as a color generation layer. The photoluminescent molecules present in the fibers in this third structure are randomly oriented, requiring both a polarizer and analyzer in the resultant structure.

Figure 6A:
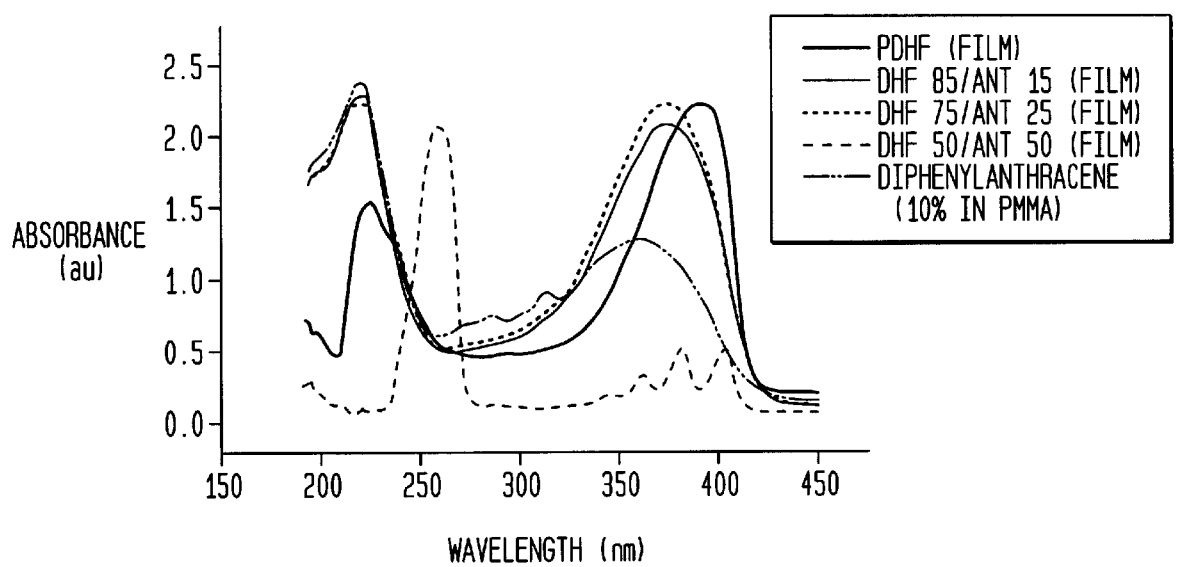
FIGS. 6(a) and 6(b) illustrate respective UV absorption and photoluminescent spectra of a blue emitting polymer dye, DHF 85/15 Ant used in a blue fiber.
Figure 6B:
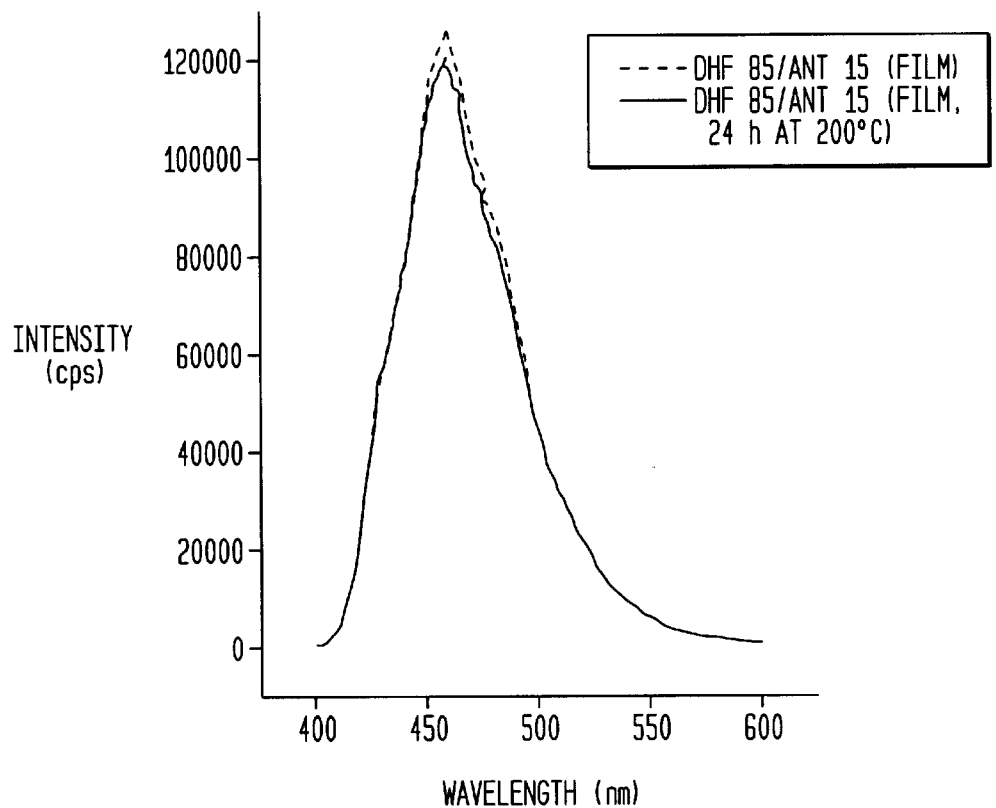
Figure 6C:
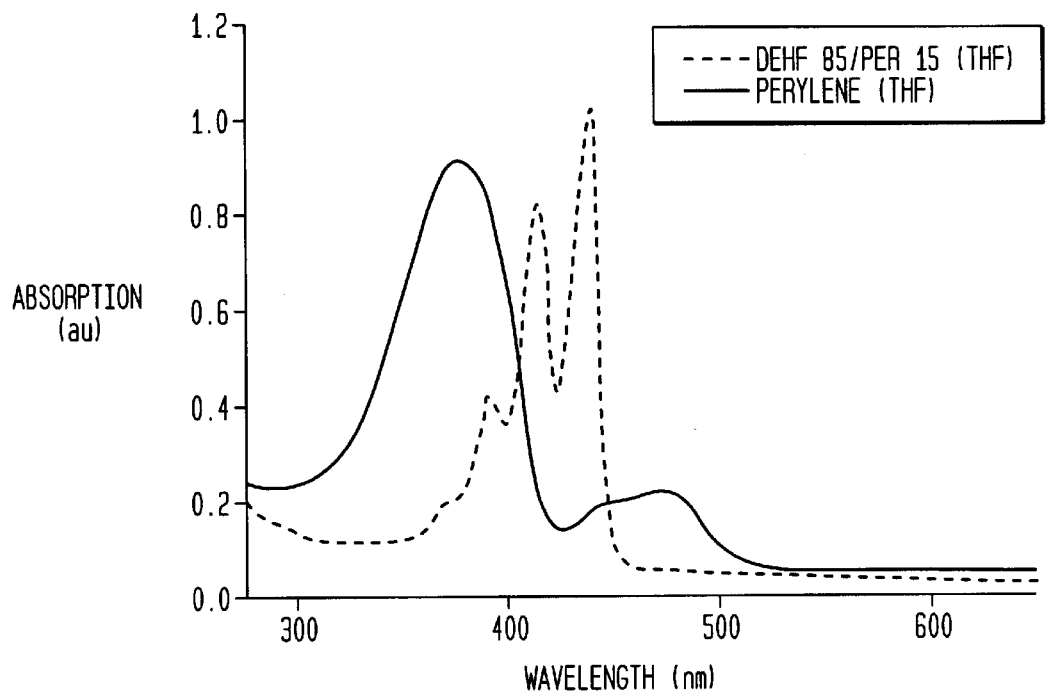
FIGS. 6(c) and 6(d) illustrate respective UV absorption and photoluminescent spectra of the green-emitting dye, DEHF 85/PER 15, used in the green fiber.
Figure 6D:
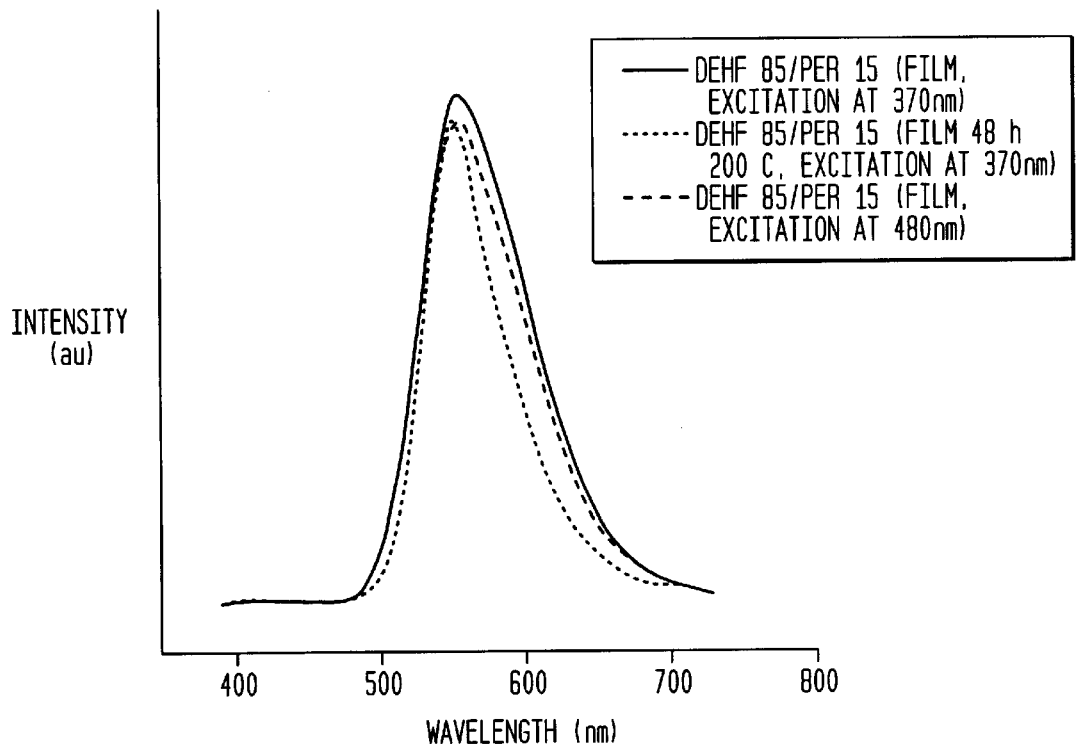

For each of the embodiments described, polyethylene is used as the matrix material for the PL fibers. For the blue and green emitting fibers, the incident UV or short-wavelength blue light is first absorbed by sensitizer molecules. The energy is then transferred to the photoluminescent molecules from the sensitizer. This energy transfer leads to an emission of corresponding visible light. Preferably, the composition of sensitizer and light emitting materials present in the bulk fiber array may range anywhere from 0.1% to 100% by weight. (A 100% composition is the case when the photoluminescent polymer is used as the matrix material.) For the red fiber, the UV or short-wavelength blue light can be converted directly to the red light. However, the color conversion from UV or short-wavelength blue into red is less efficient than the conversion into blue or green. A method for solving this problem is to blend blue- or green-emitting material, as well as the red emitting dye into the matrix material in a manner as described in the reference to S. Tasch, et al., entitled "Efficient red- and orange-light-emitting diodes realized by excitation energy transfer from blue-light-emitting conjugated polymers" Phys. Rev. B 56 4479 (1997) incorporated by reference herein. The energy is absorbed by the sensitizer and transferred to the blue- or green-emitting material, and transferred again to the red-emitting material. Thus, a red emission is obtained from the energy transfer from the sensitizer to the red-emitting material. Emission and absorption spectra of some of the polymeric dyes used in the LCD devices of the invention are shown herein with respect to FIG. 6(a).

In operation, when these emitting fibers are optically excited by unpolarized UV light 128 through light guide 160, a first dye material (hereinafter "Dye A") comprising small molecule absorbers present in the fibers absorbs all the light and transfers the absorbed energy, e.g., to a second material which is a stretch-aligned polymer with oriented optical dipole moments. The polymer material emits the transferred energy as polarized light at the wavelengths of the red, green or blue spectral regions. It is understood that the energy transfer process occurring in the fiber is either an electronic process or an optical absorption process, depending on the combination of Dye A and polymer materials. The small molecule absorbers comprising Dye A may be selected so that minimum orientation of the dyes is achieved during a stretching. These molecules are preferably largely isotropic since they are to absorb the unpolarized light and transfer energy to aligned rod-like polymers which emit polarized light. Examples of absorbing Dye A materials which preferably absorb light in the near-UV region of the spectrum (325–400 nm) and emit in the short wavelength blue light (380–440 nm) include, but are not limited to:

| Dye A | Abs. Max. | Em. Max. | Reference |
|---|---|---|---|
| Coumarin 2 | 365 nm | 435 nm | Eastman Kodak Catalog |
| Coumarin 4 | 322 nm | 386 nm | Eastman Kodak Catalog |
| Carbostyryl 3 | 360 nm | 425 nm | Lambdachrome Laser Dyes |
| Carbostyryl 7 | 349 nm | 405 nm | Lambdachrome Laser Dyes |

Further, in the blue fiber, the energy absorbed by Dye A is transferred to a stretch-aligned polymer which absorbs in the short wavelength blue light (380–440 nm) and emits polarized light in the blue region of the spectrum (440–490 nm). Examples of this type of polymer include, but are not limited to:

| Polymer | Abs. Max. | Em. Max. | Reference |
|---|---|---|---|
| DHF/15Ant | 380 nm | 455 nm | (1) |
| m-LPPP | 455 nm | 460 nm | (2) |
| DHF/25Ant/25TPA | 370 nm | 462 nm | (1) | with reference (1) entitled "Photo and Electroluminescence from Fluorene Containing Copolymers," Polym. Prepr. 39(2), 1000 (1998) by R. D. Miller, G. Klaerner, M. Kreyenschmidt, J. Kwak, J. Ashenhurst, T. Fuhrer, W.-D. Chen., S. Karg, J. C. Scott, and incorporated by reference herein, and reference (2) entitled "Electroluminescence and Photoluminescence of conjugated Polymers and Oligomers" SPIE 2527, 307–314 by G. Leising, G. Kopping-Grem, F. Meghdadi, A. Niko, S. Tasch, W. Fischer, L. Pu, M. W. Wagner, R. H. Grubbs, L. Athouel, G. Froyer, U. Scherf, J. Huber, the contents and disclosure of which is incorporated by reference herein.

In the green fiber, the energy absorbed by Dye A is transferred to a stretch-aligned polymer which absorbs in the short wavelength blue light (380–440 nm) and emits polarized light in the green region of the spectrum (510–540 nm). Examples of this type of polymer include, but are not limited to:

| Polymer | Abs. Max. | Em. Max. | Reference |
|---|---|---|---|
| PPy | 360 nm | 540 nm | (3) |
| PAV-PPV | 408 nm | 512 nm | (4) |
| DEHF 85/PER 15 | 370 | 540 nm | (5) |
| BUEH-PPV | 422 nm | 524 nm | (6) |
| CN-PPV-Carbazole | 412 nm | 525 nm | (7) |
| PPyV-Ant | 418 nm | 527 nm | (8) |

-continued

| Polymer | Abs. Max. | Em. Max. | Reference |
|---|---|---|---|
| DHF 40/Ant 10/Sulf 40/TPA 10 | 380 nm | 510 nm | (9) | with reference (3) entitled "Measurement of time dependent quantum yield of poly(p-pyridine) and poly(p-phenylenevinylene)," Synth. Met. 84 (1997) 951–952 by M. Halim, I. D. W. Samuel, E. Rebourt, A. P. Monkman; with reference (4) entitled "Novel light emitting and photoconducting polyarylenevinylene derivatives containing phenylene arylamine and phenylene oxide units in the main chain," ICSM 96; p 134 by H. Rose; A. Teuschel, S. Pfeiffer, H.-H. Horhold; with reference (5) entitled "Color tuning in polyfluorenes by copolymerization with low band gap comonomers," Synth. Met. 102 (1999) 1087 by J.-I. Lee, G. Klaerner, M. H. Davey, R. D. Miller; with reference (6) entitled "Photoluminescence and electroluminescence of films from soluble PPV-polymers," Synth. Met. 85 (1997) 1275–1276 by M. R. Andersson, G. Yu, A. J. Heeger; with reference (7) entitled "Synthesis and electroluminescent property of a new conjugated polymer based on carbazole derivative: poly(3; 6-N-2-ethylhexyl carbozolyl cyanophthalilidene)," Synth. Met. 88 (1997) 31–35 by J.-H. Lee, J.-W. Park, S.-K. Choi; with reference (8) entitled "Copolymers containing meta-pyridylvinylene and para-arylenevinylene fragments: synthesis; quaternization reaction and photophysical properties," SPIE 3145, 260–270 by N. N. Barashkov, H. J. Olivos, J. P. Ferraris; and with reference (9) authored by R. D. Miller, et al., Mol. Cryst. Liq. Cryst. Nonlinear Optics 20 (1999) 269 (in press). The contents of each of references (3)–(9) are incorporated by reference as if fully set forth herein. The chemical structure of DEHF 85/PER 15 random copolymer described in above-mentioned reference (5) is represented as:

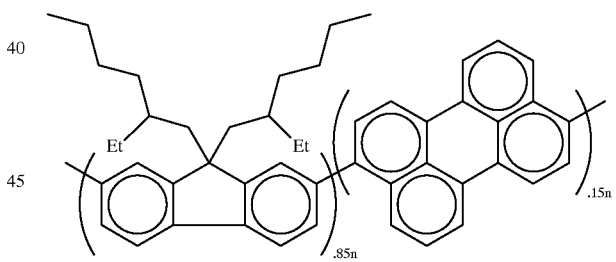

The chemical structure of the random tetrapolymer DHF 40/Ant 10/Sulf 40/TPA 10 described in reference (9) is represented as:

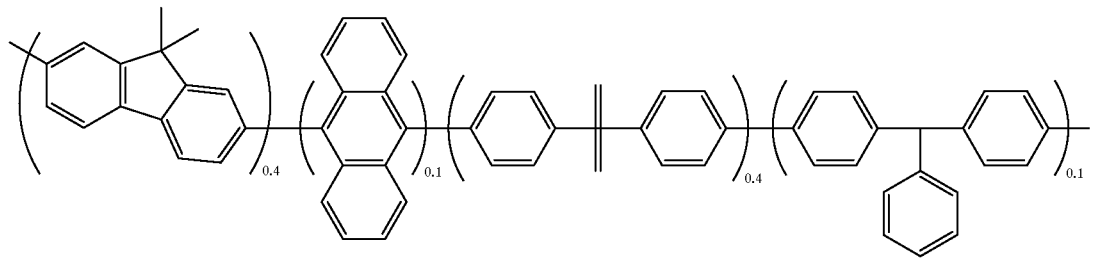

In the red fiber, the energy absorbed by Dye A may be transferred directly to a stretch-aligned polymer which absorbs in the short wavelength blue light (380–440 nm) and emits polarized light in the red region of the spectrum (>600 nm). Alternatively, the energy may be transferred through a second dye material, hereinafter "Dye B", which absorbs in the short wavelength blue light and emits in the green, yellow or orange region of the spectrum. In this case, the red emitting polymer absorbs in the range of Dye B emission. Thus, many combinations of PL materials for the red emission wavelength region are available. Examples of the red polymer materials include, but are not limited to:

| Polymer | Abs. Max. | Em. Max. | Reference |
| --- | --- | --- | --- |
| 3-substituted PThiophenes | 424 nm | 625–662 nm | (10)(11) |
| CN-PPV | 590 nm | 710 nm | (10) | with reference (10) entitled "Measurement of Absolute photoluminescence quantum efficiencies in conjugated polymers," Chem. Phys. Lett. 241 (1995) 89–96 by N. C. Greenham, I. D. W. Samuel, G. R. Hayes, R. T. Phillips, Y. A. R. R. Kessner, S. C. Moratti, A. B. Holmes, R. H. Friend; with reference (11) entitled "Improved photoluminescence efficiency of films from conjugated polymers," Synth. Met.85 (1997) 1383–1384 by M. R. Andersson, M. Berggren, T. Olinga, T. Hjertberg, O Inganas, O Wennerstrom. The contents and disclosure of each of references (10)–(11) are being incorporated by reference as if fully set forth herein.

Examples of Dye B material include, but are not limited to:

| Dye B | Abs. Max. | Em. Max | Reference |
| --- | --- | --- | --- |
| Coumarin 540 | 458 nm | 505 nm | Lambdachrome Laser Dyes |
| Pyrromethene 546 | 494 nm | 519 nm | Lambdachrome Laser Dyes |

According to the invention, cost reduction may further be achieved without the use of polarized emission. In these alternate embodiments, the conjugated polymer emitter is replaced by a dye material which emits unpolarized light of selected wavelengths. In this case, materials may be used which both absorb and emit without the need for transfer. Thus a wider range of dyes becomes available. Thus, example materials for UV absorption and Blue emission include, but are not limited to:

| Material | Abs. Max. | Em. Max | Reference |
| --- | --- | --- | --- |
| Coumarin 1 | 373 nm | 450 nm | Lambdachrome Laser Dyes |
| Coumarin 102 | 389 nm | 465 nm | Lambdachrome Laser Dyes |
| P2MeAq | 375 nm | 460 nm | (12) |
| DHF-15Ant | 380 nm | 455 nm | (1) |
| PHP | 315 nm | 425 nm | (13) |
| PBBNBT | 338 nm | 452 nm | (14) | with reference (12) entitled "Polypyridine block as molecular antenna in photoluminescence of macromolecular systems," Macromol. Rapid Commun. 16, 549–556 (1995) by T. Yamamoto, Y. Yoneda, K. Kizu; with reference (13) entitled "Red-Green-Blue emission of parahexaphenyl devices with color-converting media," J. Appl. Phys. 82(9), (1997) 4177–4182 by A. Niko, S. Tasch, F. Meghdadi, C. Brandstatter and G. Leising; and, with reference (14) entitled "Poly(thiazole)s: A New Class of Conjugated Polymers for Polymer-based Light-Emitting Diodes," Mat. Res. .Soc. Symp. Proc. 424 (1997) 496–500 by J. K. Politis, J. Nanos, Y. He, J. Kanicki, M. D. Curtis, the contents and disclosure of each of references (12)–(14) being incorporated by reference as if fully set forth herein.

An appropriate dye for UV absorption and Green emission is PPy (as described above). Appropriate dyes for Blue absorption and Green emission, include for use in combination with UV absorption and blue emission dyes, but are not limited to:

| Dye | Abs. Max. | Em. Max. | Reference |
| --- | --- | --- | --- |
| Coumarin 540 | 458 nm | 505 nm | Lambdachrome Laser Dyes |
| Pyrromethene 546 | 494 nm | 519 nm | Lambdachrome Laser Dyes |
| Coumarin 510 | 425 nm | 510 nm | Lambdachrome Laser Dyes |
| Coumarin 153 | 423 nm | 530 nm | Lambdachrome Laser Dyes |
| NBD | 465 nm | 540 nm | Molecular Probes Inc. |
| HPTS | 455 nm | 510 nm | Eastman Kodak Catalog |
| Quinacridone |  | 540 nm | Sanyo U.S. Pat. No. 5,693,428 12/2/97 |

Appropriate dyes for absorption in the Blue/Green and Red emission, for use in combination with UV absorbing and blue/green emitting dyes, include, but are not limited to:

| Dye | Abs. Max. | Em. Max | Reference |
| --- | --- | --- | --- |
| DCM | 472 nm | 644 nm | Lambdachrome Laser Dyes |
| Lumogen F-300 | 578 nm | 613 nm | BASF |
| Phenoxazone 9 | 550 nm | 650 nm | Lambdachrome Laser Dyes |

Figure 3:
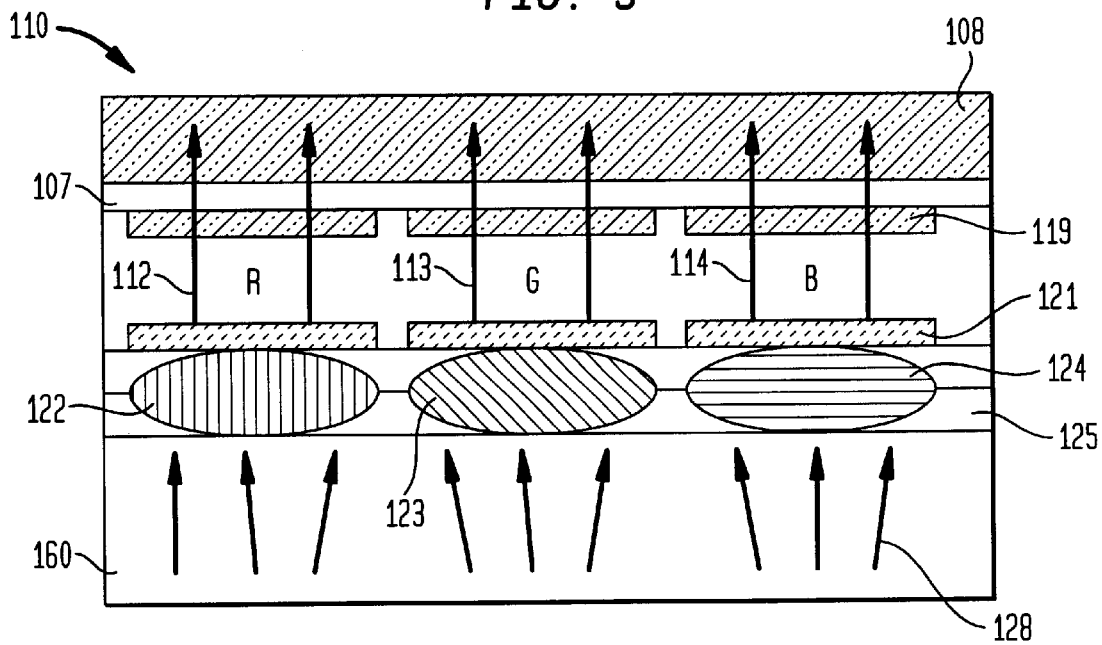
FIG. 3 is a cross-sectional view of an LCD pixel implementing the PL fiber arrays according to a first embodiment of the present invention.

A detailed cross-sectional view of a LCD pixel structure provided in accordance with the first embodiment wherein the PL fibers are situated behind the LC shutter in the LCD panel (of FIG. 2) is illustrated in FIG. 3. As shown in FIG. 3, the pixel 110 comprises an analyzer 107, a glass substrate 108, and, a set of red, green and blue liquid crystal cells 112, 113 and 114 respectively, which are sandwiched between transparent electrodes 119 and 121. Corresponding to each liquid crystal cell 112, 113 and 114 is a respective red dye-doped polymer fiber 122, a green dye-doped polymer fiber 123 and a blue dye-doped polymer fiber 124, respectively. These emitting fibers 122–124 are supported by a fiber support structure 125 to form the fiber array. Although not shown in FIG. 3, a series of grooves are generated by conventional stamping techniques in the support structure 125 for accommodating placement of the emitting fibers.

Figure 7A:
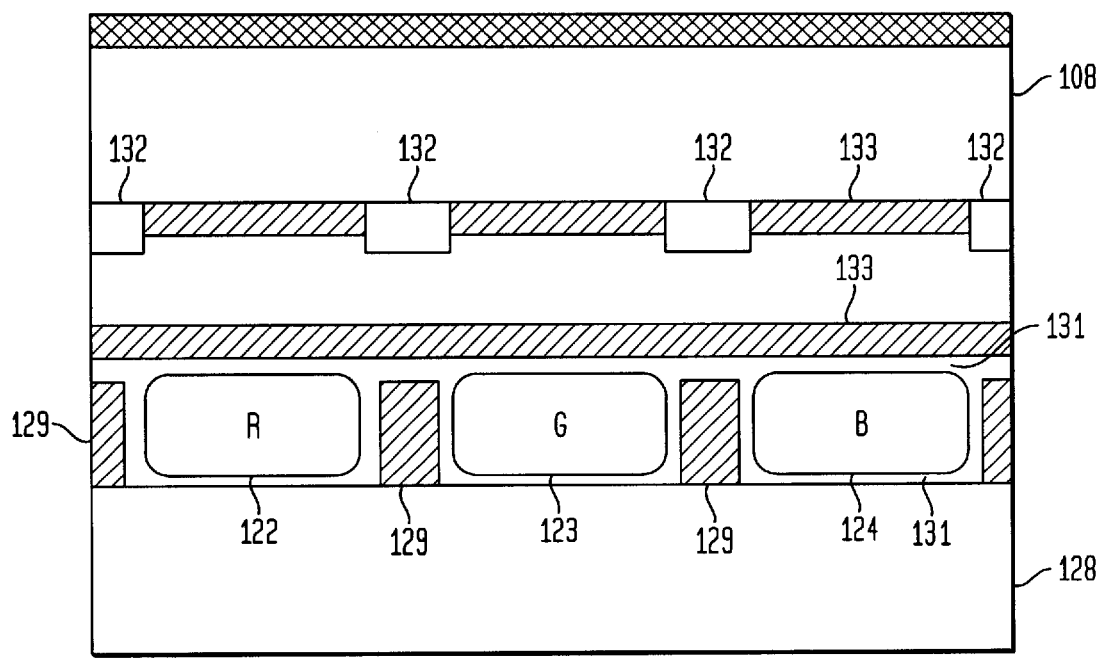
FIG. 7(a) is a detailed, cross-sectional view of the LCD pixel structure manufactured according to the first embodiment and manufactured according to a first array fabrication technique.

FIG. 7(a) is a detailed, cross-sectional view of the LCD pixel structure according to the first embodiment, in which the fiber arrays are located behind the LC shutter inside the LC cell. In this structure, according to FIG. 2, the light is generated by a backlight (not shown) comprising of a fluorescent lamp coated by UV or short-wavelength blue phosphor, a light guide and a reflector. A prism sheet directs the generated light in a forward direction "A" such that it is incident on the LC cells consisting of the glass substrates, fiber array, TFT array 132, ITO (transparent electrodes) 133 and LCs. The modulated light goes through the analyzer (see Figure) towards the viewer. In an example embodiment, the thickness of the prism sheet is about 200 um, and the thickness of the each glass substrate about 700 um thick. The thickness of the LC layer is about 5 um and the analyzer thickness is about 180 um thick. Two methods for fabricating the PL fiber arrays according to the first embodiment are presented: a method which uses opaque walls to separate and align PL fibers (the embodiment of FIG. 7(a)) and; a method in which PL fibers are laminated to form a sheet prior to the LC cell fabrication (the embodiment of FIG. 7(b)).

In the first example fabrication method implemented for the pixel structure as shown in FIG. 7(a), PL fibers 122–124, each formed of a rectangular shape having an exemplary dimension of about 70 μm×30 μm, are fabricated and arranged between photolithographically patterned opaque walls 129 made of polymeric thick resist that absorb visible light (for example, CK3100 from Fujifilm Olin). Each wall 129 is preferably of rectangular cross-section having an exemplary dimension of about 20 μm width and 30 μm high and, a periodicity of separation of about 90 μm. The opaque walls 129 function to: 1) align PL fibers with the subpixels of the LC cells; and, 2) prevent a color mixing from the light emerging from the side walls of the fibers. The PL fibers are preferably fixed on the substrate by an adhesive agent on the substrate and then covered with the polymeric overcoat to absorb UV light and prevent UV light leakage. Specifically, the adhesive agent is spincoated on top of the walls and the substrate with the fibers laid down between the walls by holding the fibers using a metallic frame having grooves the size of the respective fiber (70 μm) and having a period of the subpixel distance (90 μm). The TFT arrays 132 are fabricated on top of the overcoat 131 using an existing "array on plastic" technique such as described in the reference to P. G. Carey, P. M. Smith, P. Wickboldt, M. O. Thompson and T. W. Sigmon entitled "Polysilicon TFT fabrication on plastic substrates." SID Conference Record of the International Display Research Conference 1997, SID, Santa Ana, Calif, USA. p M36–M39, the contents of which is incorporated by reference herein. ITO layers 133 are fabricated on top of the TFT array. In an example implementation, polyethylene is used as matrix material, with Coumarin 4 used as a sensitiser. For uniaxially oriented photoluminescent molecules, 3-substituted poly(thiophene) is used as a red emitting dye, DEHF 85/PER15 is used as a green emitting dye and DHF85/15 Ant as the blue emitting dye. The absorption and emission maxima for each dye in this example embodiment is listed in Table 1 as follows:

TABLE 1

| Dye | | Abs. Max | Em. Max |
| --- | --- | --- | --- |
| Sensitizer | Coumarin 4 | 332 nm | 386 nm |
| Red | 3 substituted poly(thiophene) | 424 nm | 625–662 nm |
| Green | DEHF 85/PER 15 | 370 nm | 540 nm |
| Blue | DHF 85/15 Ant | 380 nm | 455 nm |

Figure 7B:
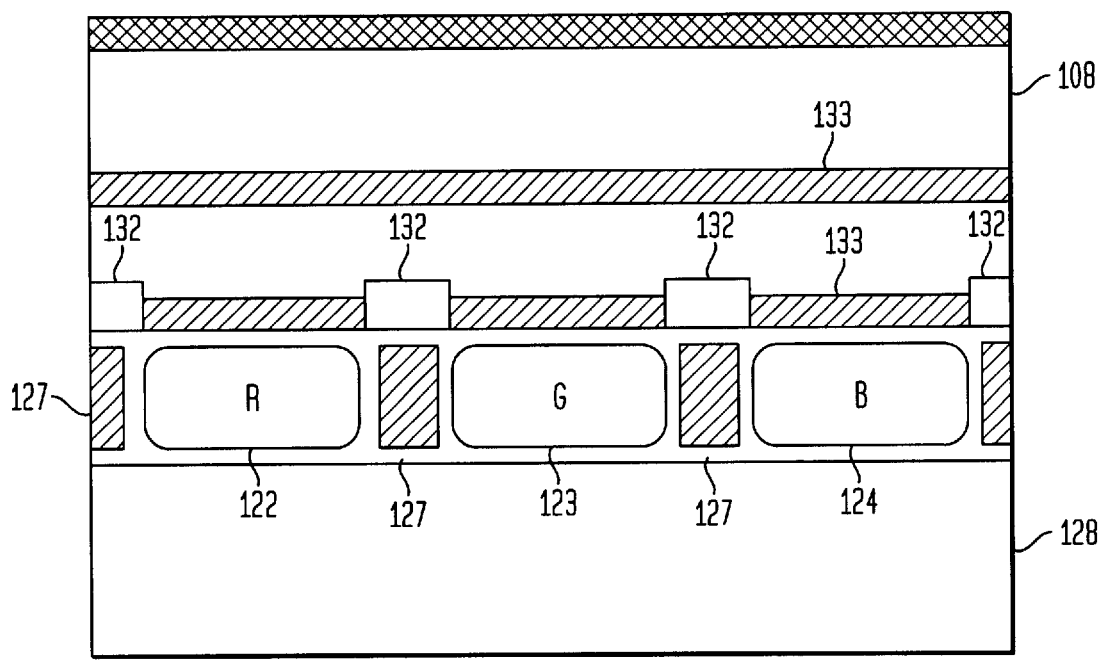
FIG. 7(b) is a detailed, cross-sectional view of the LCD pixel structure according to the first embodiment and manufactured according to a second array fabrication technique.

In a second example fabrication method resulting in the pixel structure as shown in FIG. 7(b), the rectangular PL fibers are laminated by a polymeric agent to form an array prior to the cell assembly. In the example embodiment depicted, the PL fibers 122–124 are rectangular in cross-section fibers having dimensions of about 60 μm×30 μm. In this structure, opaque fibers 127 of 30 μm×30 μm square cross-section are placed between PL polarizing fibers of the array to prevent color mixing. The fibers are aligned by an aid of photolithographically patterned protrusions fabricated at the edge of the substrates. A metallic frame (not shown) guides the fibers between the protrusions at the edges of the substrates, with the TFT arrays being fabricated on top of the laminated fiber array using the above-mentioned "array on plastic" technique.

In an example implementation, polyethylene is used as the matrix material, and Carbostyryl 3 as a sensitizer. For uniaxially oriented molecules, a combination of Coumarin 540 and CN-PPV is used as a red emitter, PPyV-Ant was used as a green emitter and m-LPPP was used as a blue emitter. The absorption and the emission maxima for each are provided in Table 2, as follows:

TABLE 2

| Dye | | Abs. Max | Em. Max |
| --- | --- | --- | --- |
| Sensitizer | Carbostyryl 3 | 360 nm | 455 nm |
| Red | Coumarin 540/ CN-PPV | 458 nm | 710 nin |
| Green | PPyV-Ant | 418 nm | 527 nm |
| Blue | m-LPPP | 455 rr#n | 460 nm |

In view of FIG. 3, it is seen that the polarized red, green and blue light may be further modulated by liquid crystal cells 112–114 and analyzer 107, prior to emission from the panel surface. However, in the device 100 of FIGS. 2 and 3, it is readily seen that both polarizer and color filters which significantly reduce the optical yield of the LCD panel, may be eliminated.

According to the invention, polyethylene may be used as the matrix material that comprises fibers 122, 123 and 124 and may be prepared by techniques familiar in the textile industry. Representative examples are provided in "Contemporary Polymer Chemistry" H. R. Allcock and F. W. Lampe, Prentice-Hall Inc. 1981, p. 514ff. The fibers can be corrugated if necessary, to prevent wave guiding in the fibers. It is understood that the red, green, blue fiber array is made by conventional fabric lamination processes, such as the production of carbon fiber laminated films. Red, green and blue fibers are aligned to fit the size of the corresponding red, green, blue liquid crystal cells. The manufacturing process is thus simplified and does not require any optical lithography, which increases the cost. Using this process, production time and cost are significantly reduced.

Figure 4:
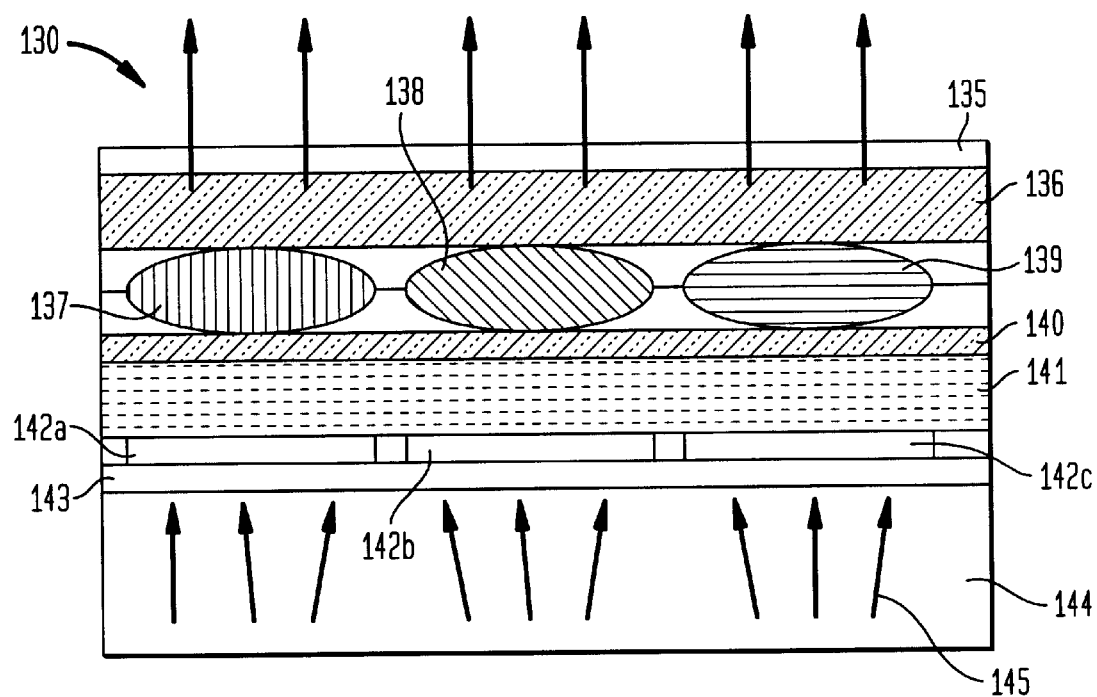
FIG. 4 is a cross-sectional view of an LCD pixel implementing the PL fiber arrays according to a second embodiment of the present invention.

FIG. 4 is a cross-sectional view of a LCD pixel according to a second embodiment of the present invention. As shown in FIG. 4, the pixel 130 comprises an optical guide 144 for guiding UV light 145 through a polarizer 143, and, includes transparent electrodes 142a,b,c corresponding to a set of red, green and blue liquid crystal cells 141 which is sandwiched between another transparent electrode 140. Corresponding to each liquid crystal cell is an array of fibers including red dye-doped polymer fiber 137, a green dye-doped polymer fiber 138 and a blue dye-doped polymer fiber 139, suitably supported by a support structure to form the array. These respective red, green and blue emitting fibers 137–139 are positioned beneath glass substrate 136 having anti-reflective coating 135. As shown in this second embodiment depicted in FIG. 4, the positions of the liquid crystal cells and the fiber array are inverted as compared to the embodiment of FIG.

3. Thus, in this device, unpolarized UV light 145 becomes polarized through use of a polarizer 143, which then illuminates the red, green and blue fibers 137, 138, 139, respectively, through the liquid crystal cells 141. The fibers utilized in this embodiment have stretch-aligned polymer sensitizers, and absorb only one polarization which is pre-aligned in the same direction of the polarizer 143. Therefore, if the polarization direction of UV light is changed by liquid crystal cell, then the fiber can absorb the UV light and a light intensity modulation will result. As easily understood, this configuration eliminates the analyzer and the lithographic processing involved in the color filters of conventional LCD devices.

Figure 8A:
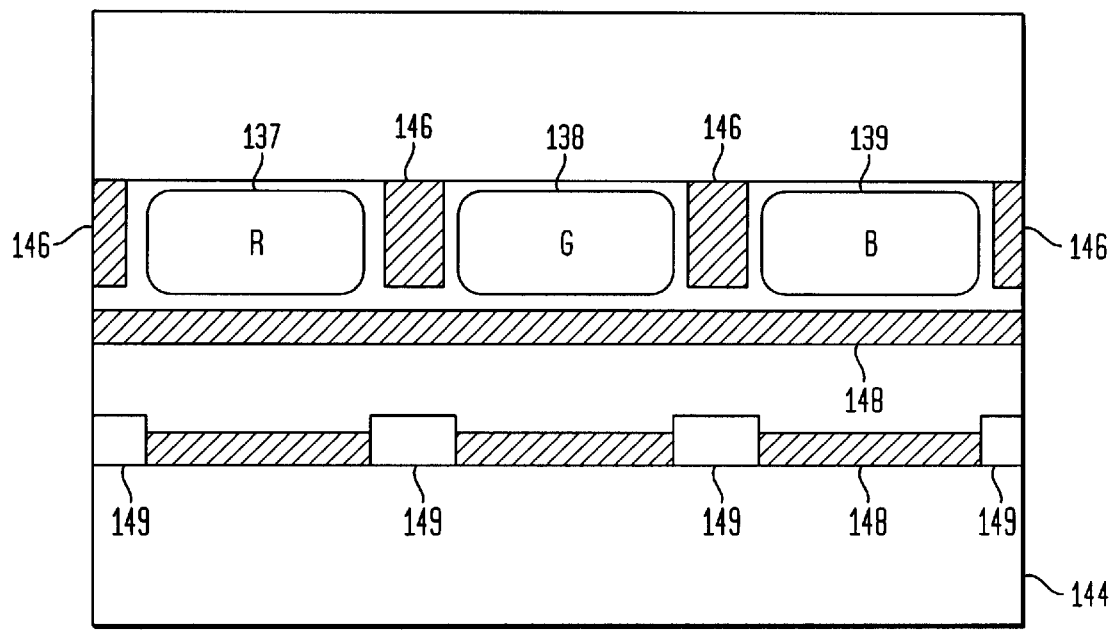
FIG. 8(a) is a detailed, cross-sectional view of the LCD pixel structure according to the second embodiment and manufactured according to the first array fabrication technique; and, FIG. 8(b) is a detailed, cross-sectional view of the LCD pixel structure according to the second embodiment and manufactured according to the second array fabrication technique.

FIG. 8(a) is a detailed, cross-sectional view of the LCD pixel structure according to the second embodiment, in which the PL fibers 137–139 are located on top of the LC shutter inside the LC cell. As shown in FIG. 8(a), the fluorescent lamp coated by phosphors having an emission at short-wavelength blue region (380–440 nm) generate light as in the case of the first embodiment. A diffuser redistributes the light propagated through the light guide and a prism sheet redirect light towards the viewing direction. The LC pixel comprises a TFT array 149, an LC layer (See Figure), fiber arrays 137–139 and ITO (transparent electrodes) 148. The fiber arrays act as an analyzer for a light modulation, hence an isotropic-to-polarized conversion by the fiber is not needed in this configuration. The fibers consist of uniaxially oriented photoluminescent polymers as sensitizers and the polymer matrix material. As in the first embodiment, the fiber arrays according to the second embodiment are fabricated using two methods: 1) In the first method, a photo-lithographically patterned opaque grid 146 having columns is fabricated for separating the PL fibers according to the subpixels of the LC cell and to prevent color mixing. The opaque grid 146 is made by a resist and is of a rectangular cross-section shape about 20 μm wide and 30 μm high. The cross-section of the PL fiber is about 70 μm×30 μm with the liquid crystal layer being about 5 μm thick. The grid walls are separated by the size of the subpixel which is about 90 μm). The alignment process implemented for this embodiment is the same as that implemented for the first embodiment except the fact that the opaque walls are replaced by the opaque grid. That is, the PL fibers are laid down between the columns of the grid and are pressed down against the surface of the rows of the grid. The TFT array 149 is fabricated on the bottom glass substrate 144. Preferably, the PL fibers are fixed by an adhesive agent and include a polymeric overcoat to absorb UV light and prevent UV light leakage. The PL fibers act as a color generation layer and an analyzer for the light modulation. In an example implementation, polyethylene is used as matrix material. For uniaxially aligned polymers, a 3 substituted PThiophene is used as a red emitter, DEHF 85/PER 15 as a green emitter and DHF/25 Ant/25 TPA as a blue emitter. The absorption and emission maxima are provided in Table 3 as follows:

TABLE 3

| Dye | | Abs. Max | Em. Max |
| --- | --- | --- | --- |
| Red | 3 substituted PThiophene | 424 nm | 626 nm |
| Green | DEHF 85/PER 15 | 370 nm | 540 nm |
| Blue | DHF/25 Ant/25 TPA | 370 nm | 462 nm |

Figure 8B:
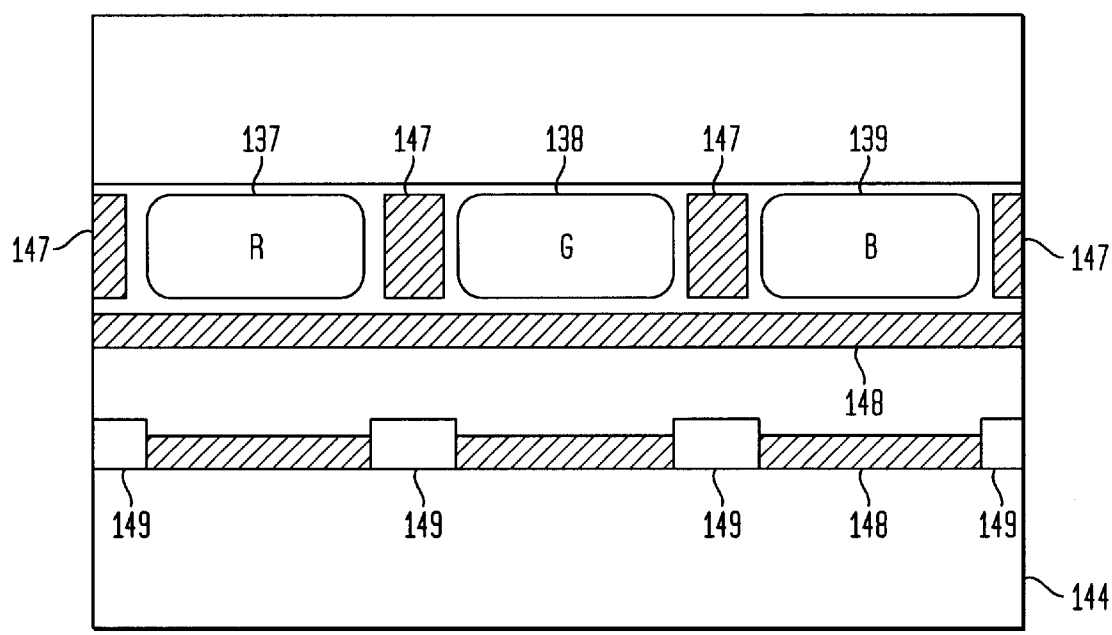

In a second example fabrication method implemented for the pixel structure as shown in FIG. 8(b), the PL fiber arrays are laminated prior to the cell assembly. Opaque fibers 147 having a square-shaped cross-section (30 μm×30 μm) form a grid aligned with the subpixel of the LC cell. Thus, the grid is formed by opaque fibers rather than a photolithographically patterned grid. The rectangular shaped fibers (60 μm×30 μm cross-section) are pressed in between the columns in the fiber grid. The alignments of the fibers and the grid are done with aid of a metallic frame (not shown) having grooves of the size of the cross-section of the fibers. The fiber arrays are laminated using polymeric sheets. The grid acts as a black matrix for the TFT arrays and also as a blockage to prevent a light leakage along and in between the fibers. The TFT arrays 148 and ITO layers 149 are patterned on the bottom glass substrate 144. The ITO layer is also coated on the laminated fiber arrays. The PL fibers act as an analyzer. Although the combination of dyes shown in Table 3 may be used in the structure depicted in FIG. 8(b), another example implementation may include, for uniaxially oriented molecules, a combination of CN-PPV and DHF 40/Ant 10/Sulf 40/TPA 10 for the red emitter, DHF40/ Ant 10 / Sulf 40/ TPA 10 for the green emitter, and DHF/25 Ant/ 25 TPA for the blue emitter. The absorption and emission maxima for these dyes are listed in Table 4, as follows:

TABLE 4

| Dye | | Abs. Max | Em. Max |
| --- | --- | --- | --- |
| Red | DHF40/Ant 10/Sulf 40/TPA 10/CN-PPV | 380 nm | 710 nm |
| Green | DHF40/Ant 10/Sulf 40/TPA 10 | 380 nm | 510 nm |
| Blue | DHF/25 Ant/25 TPA | 370 nm | 462 nm |

Figure 5A:
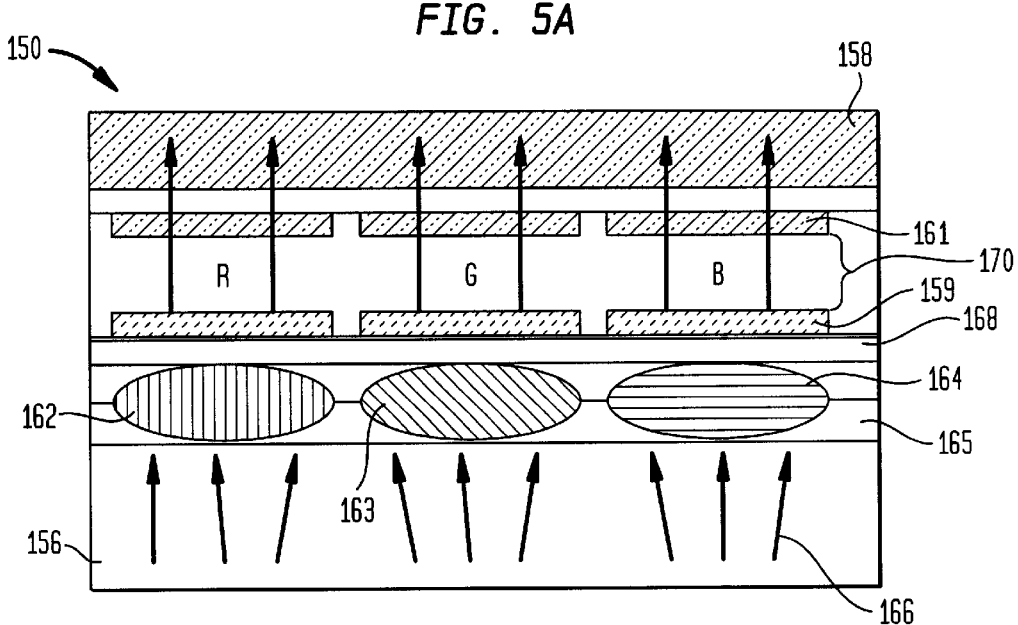
FIGS. 5(a) and 5(b) illustrate a cross-sectional view of an LCD pixel implementing the PL fiber arrays according to a third embodiment of the present invention.

FIG. 5(a) is a cross-sectional view illustrating a third embodiment of the liquid crystal display device of the present invention. As shown in FIG. 5(a), the pixel 150 comprises an optical guide 156 for guiding UV light 166 through a fiber array including red dye-doped polymer fiber 162, a green dye-doped polymer fiber 163 and a blue dye-doped polymer fiber 164, suitably supported by fiber support structure 165 to form the array. Positioned above the emitting fiber array is a polarizer 168, and a set 170 of respective red, green and blue LC cells, which are sandwiched between corresponding transparent electrodes 159 and 161. Positioned immediately above the transparent electrode is the analyzer 157 and immediately thereabove, glass substrate 158. When the red, green and blue dye-doped polymer fibers are optically excited by UV light through light guide 156, using unpolarized UV light, the sensitizer material absorbs the light and either re-emits or transfers the absorbed energy to a second photoluminescent material which emits the transferred energy as unpolarized light at the wavelengths of the red, green and blue regions. As previously mentioned, this energy transfer process is either an electronic process or an optical absorption process, which depends on the combination of Dye A and Dye B. The unpolarized red, green and blue light is modulated by the polarizer 168, LC cells 170 and analyzer 157, and are emitted through the panel surface. In this configuration, the fibers replace the color filters and the eliminate the expensive lithographic processing involved in their manufacture.

Figure 5B:
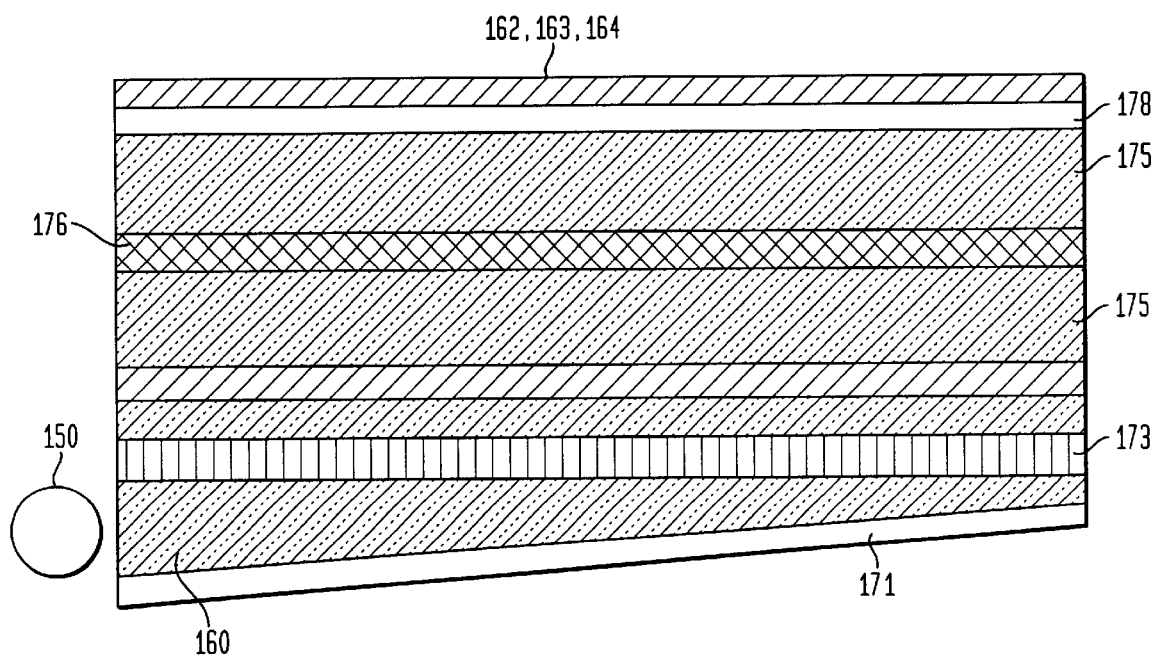

In an alternate embodiment of the third LCD structure depicted in FIG. 5(b), the PL fiber array 162–164 are placed on top of the LC cell to function as a color generation layer. The fibers thus only contain randomly oriented photoluminescent molecules and a polymeric base. The short-wavelength blue light is generated by fluorescent lamp 150 as in the first two embodiments. The display structure further comprises a light guide panel 160 and reflector 171, a prism sheet 173, the glass substrate 175, the TFT array/LC and ITO layer 176, and an analyzer 178. All light modulation is done in the LC cell with the analyzer glued on top of the LC cell. Preferably, as shown, the laminated fiber array 162–164 lies above analyzer element and is fabricated in the manner as described above with respect to FIG. 8(b) wherein the PL fibers are pressed in between the columns of the grid formed by opaque fibers (30 μm×30 μm square cross-section). The PL fibers have a 60 μm×30 μm rectangular shape cross-section. The absorption and emission maxima for the dyes are provided in Table 5, as follows:

TABLE 5

| Dye | | Abs. Max | Em. Max |
| --- | --- | --- | --- |
| Red | Coumarin 102/ | 389 nm/ | 465 nm/ |
| | DCM | 472 nm | 644 nm |
| Green | PPy | 360 nm | 540 nm |
| Blue | Coumarin 1 | 373 nm | 450 nm |

In each of the embodiments depicted in FIGS. 3–5 the grooves to support the color fibers may be stamped or fabricated from a low index isotropic substrate (e.g., fiber support 125 in FIG. 3). Since the pixel size is on the order of tens of microns, preferably, the fibers are slightly larger. Thus, fabrication by melt extrusion and stretching techniques do not present a problem. The fibers may be sealed in the grooves with a low index, low viscosity crosslinking polymer (e.g. photopolymerizable acrylate, etc). The fiber surface may then be polished so that only hemispheres remain with their flat side flush with the planar surface enabling the emitters to be firmly sealed in the low index material. This should confine the light within the fiber by internal reflection until it exits from the flat side. Placing a thin, e.g., one-quarter lambda (¼λ) coating of a high index polymer on top will aid in light emission while hinder waveguiding down the fiber. This coating may be spatially blackened to stop any blue light that doesn't pass through the fiber.

According to another aspect of the invention, a conventional spinning technique may be used for fabricating the fibers such as disclosed in the reference for example in "Advanced Fiber Spinning Technology" T. Nakajima ed. The fiber contains polymer matrix material, sensitizer molecules and/or photoluminescent polarizing molecules. The fibers may be made in a desired shape on the order of microns according to techniques described in the reference to S. C. Tseng, C. T. Shi, C. L. Kuo and Y. Cheng "A New Pattern on Fabrication of Fiber Spinnerets by the LIGA Technology" in Part of the Symposium on Design, Test, and Microfabrication of MEMS and MOEMS Paris, France, March–April 1999, SPIE 3680 518 and Y. W. Noh, S. Y. Kim and Y. Kwon "Experimental and Theoretical Study of Rectangular Fiber Melt Spinning" Intern. Polymer Processing XII 4 366 (1997), the whole contents and disclosure of which is incorporated by reference as if fully set forth herein. In the LCD structures of the invention, the shape of the fibers are rectangular and may be fabricated by the methods described in the above-incorporated reference to Y. W. Noh, S. Y. Kim and Y. Kwon. The size of the fibers and the dye concentration are controllable so that the luminescence will be uniform across and along the fibers.

The efficiency of the liquid crystal display of a conventional architecture using an Hg discharge fluorescent lamp as compared with the PL-LCD that uses the same lamp but coated by phosphors that emit UV or short-wavelength blue light is now shown in Table 6.

TABLE 6

| Change to the Display Structure | Efficiency Gain |
| --- | --- |
| Wastage of visible Hg lines | × 0.9 |
| Removal of Color Filters | × 3 |

TABLE 6-continued

| Change to the Display Structure | Efficiency Gain |
| --- | --- |
| Quantum Efficiency of PL molecules | × 0.9 |
| Loss of Backward Emitted Light | × 0.5 |
| Removal of Polarizer | × 2 |
| TOTAL | × 2.4 |

It is important to realize that, according to the invention, the removal of the color filters increases the efficiency by a factor of three and the additional factor due to the quantum efficiency of the photoluminescent dye molecules which is typically 80–90%. By utilizing the PL fibers based on the two-step conversion principle, i.e., providing fibers that include randomly oriented "sensitizer" molecules which absorb isotropic incident light and which transfer energy to uniaxially oriented PL polymers which subsequently generate polarized light, the removal of polarizer increases the efficiency by a factor of two.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A liquid crystal display device including an unpolarized light source and a light shutter array for directing light for emission by one or more liquid crystal display cells, each said display cell comprising:

red, green, and blue sub-pixels each including first and second transparent electrodes and liquid crystal display materials; and, an array of photoluminescent fibers associated with said light shutter array and comprising fiber array portions aligned with and corresponding to respective sub-pixels, each fiber array portion comprising a fiber material including a respective absorbing material and a stretch-aligned polymer corresponding to a sub-pixel, said absorbing material absorbing unpolarized light of a first frequency band and generating light energy in a second frequency band corresponding to a sub-pixel color, and said stretch-aligned polymers for absorbing energy in said second frequency band and emitting light in a visible region corresponding to said sub-pixel color, wherein unpolarized light from said light source is converted to polarized light for emission by said cell.

2. The liquid crystal display device as claimed in claim 1, wherein said array of photoluminescent fibers is situated in front of said light shutter array outside said liquid crystal display cell.

3. The liquid crystal display device as claimed in claim 1, wherein in a sub-pixel fiber array, said second frequency band of said emitting light in a fiber array portion is of a wavelength longer than incident light absorbed.

4. The liquid crystal display device as claimed in claim 1, wherein said fiber array comprises a polyethylene bulk fiber material.

5. The liquid crystal display device as claimed in claim 1, wherein said fiber array comprises a uniaxially oriented photoluminescent polymer.

6. The liquid crystal display device as claimed in claim 1, wherein said fiber array portion further includes sensitiser molecules.

* * * * *